United States Patent [19]
Sofue

[11] Patent Number: 5,926,451
[45] Date of Patent: Jul. 20, 1999

[54] OPTICAL DISK UNIT HAVING REDUCED WOBBLE

[75] Inventor: Masaaki Sofue, Tokyo, Japan

[73] Assignee: Ricoh Co., Ltd., Tokyo, Japan

[21] Appl. No.: 08/790,230

[22] Filed: Jan. 28, 1997

[30] Foreign Application Priority Data

Mar. 27, 1996 [JP] Japan ................................. 8-072006

[51] Int. Cl.⁶ ............................................. G11B 17/30
[52] U.S. Cl. ............................................. 369/219
[58] Field of Search .......................... 369/219, 215, 369/220, 226; 360/105–107

[56] References Cited

U.S. PATENT DOCUMENTS

| | | | |
|---|---|---|---|
| 5,008,876 | 4/1991 | Nakagishi | 369/219 |
| 5,111,088 | 5/1992 | Fujino | 369/219 |
| 5,119,362 | 6/1992 | Yanagisawa | 369/220 |
| 5,305,299 | 4/1994 | Maeda | 369/215 |
| 5,432,772 | 7/1995 | Yamamoto | 369/219 |

FOREIGN PATENT DOCUMENTS

| | | | |
|---|---|---|---|
| 56-169268 | 12/1981 | Japan | 369/219 |
| 60-191479 | 9/1985 | Japan | 369/219 |
| 2217094 | 10/1989 | United Kingdom. | |

*Primary Examiner*—Allen T. Cao
*Attorney, Agent, or Firm*—Dickstein Shapiro Morin & Oshinsky LLP

[57] ABSTRACT

An optical disk unit for recording or reproducing information contained on an optical disk, wherein the optical head is mounted on a base that slides freely along a seek shaft. There is a clearance in the structure where the head base holds the seek shaft that allows for sliding of the head base with respect to the seek shaft. Wobbling of the head base during movement along the seek shaft, caused by the clearance around the seek haft, is reduced by a pressing portion mounted on the head base which presses against the seek shaft.

8 Claims, 4 Drawing Sheets

OPTICAL DISK UNIT HAVING REDUCED WOBBLE

FIELD OF THE INVENTION

This invention relates to an optical disk unit for recording or reproducing information contained on an optical disk.

DESCRIPTION OF PRIOR ART

An optical disk is used as a mass storage device and an optical disk unit is used for recording or reproducing information to or from an optical disk. Known optical disks include a read-only compact disk (CD), a write-once optical disk (WO) used for writing on an optical disk just once, and a magneto optical disk (MO) in which information can be freely recorded or reproduced. In these, each track is arranged in a fine spiral form from an inner circumferential surface to an outer circumferential surface which is the direction of recording or reproducing information.

An optical disk unit for recording or reproducing information to or from the optical disk is schematically shown in FIG. 5. It generally includes a turntable 101 directly connected to a driving motor 103 which drives a rotation of the optical disk 105 by using a rotation driving mechanism. An optical head 2, which records or reproduces information to or from the optical disk, has a head base on which a light emitting element, a light receiving element, and an object lens 3 are mounted. The object lens 3 is supported by a lens driving mechanism so as to have a free displacement in a radial and axial direction of the optical disk, and the entire optical head 2 is supported by a head carrying mechanism so as to move freely in a radial direction of the optical disk.

The optical head 2 of such a conventional optical disk unit is shown in greater detail in FIG. 3. As noted, optical head 2 for recording or reproducing information by optically scanning the optical disk 105 has an object lens 3, which is supported so as to have a free displacement in a tracking direction and in a focusing direction. The optical head 2 is mounted on a head base 4, which is supported by a sledge mechanism 5 so as to move freely in a radial direction of the optical disk 105.

In further detail, a pair of seek shafts 6 and 7 are arranged in parallel so that they extend in a radial direction of the optical disk, and the head base 4 is supported by the pair of the seek shafts 6 and 7 so as to slide freely therealong. One seek shaft 7 passes through head base plate 4. At a rear edge of the head base 4, a wheel 8 is installed so as to rotate freely and a magnet 9 is fixed beside it. The magnet 9 attracts the seek shaft 6 magnetically and the wheel 8 moves rotatively on the top surface of the seek shaft 6.

A pair of holding portions 10 protrude from a front edge of the head base 4 and metal bushings 11 are fitted in the holding portions 10. Since these metal bushings 11 support the seek shaft 7 with a given clearance, the metal bushings 11 are supported by the seek shaft 7 in a manner which permits them to slide freely.

A driving portion 12 of the slide mechanism 5 is located in a forward direction of the head base 4. A rack 13 is formed integrally in the front of the holding portions 10 and a sledge motor 15 is connected with this rack 13 through a gear mechanism 14.

The optical disk unit 1 in the above configuration executes at least one of the operations of recording and reproducing of information to or from the optical disk. In this process, the optical disk 1 is rotated by motor 103 and turntable 101 and the optical disk unit 1 optically scans the tracks of the optical disk by using the optical head 2.

In this scanning, a spiral track moves in a radial direction relatively to the optical head 2 when the optical disk rotates, therefore, the optical head 2 displaces the object lens 3 and the sledge mechanism 5 moves the optical head 2.

The above optical disk unit 1 has the head base 4 supported by the seek shafts 6 and 7 so as to slide freely since the optical head 2 is moved in a radial direction of the optical disk by using the sledge mechanism 5.

The sledge motor 15 stresses the rack 13 in the front of the head base 4 when the sledge mechanism 5 moves the optical head 2. This stress acts as a moment for rotating the head base 4. To prevent the rotation with this moment, the head base 4 holds the seek shaft 7 at a pair of the holding portions 10 in the front of it, being supported so that the head base 4 moves only in the axial direction of the seek shaft 7.

To realize the slide operation as described above, however, a clearance is necessary between the seek shaft 7 and the holding portions 10 of the head base 4. This clearance causes the head base 4 to wobble back and forth, or right and left, which shocks or vibrates the optical head 2. In this case, the object lens 3 supported by the optical head 2 vibrates, which causes an error in reproducing information and a loss of information to be recorded.

In order to minimize the wobbling of the head base 4, a pair of holding portions 10 for holding the seek shaft 7 are spaced approximately several tens of mm apart and the metal bushings 11 are fitted into the holding portions 10 to adjust the clearance for holding the seek shaft 7 to approx. several tens of $\mu$m. By extending the space between the holding portions 10 and decreasing the clearance for such holding, the wobbling of the head base 4 can be reduced and, as shown in FIG. 4, the wobble can be expressed as follows in terms of a rotation angle:

Rotation angle (q)=arctan (Holding clearance/holding space)

The clearance between the metal bushings 11 and the seek shaft 7, however, requires at least approx. 20 $\mu$m and the space between the holding portions 10 cannot be extended infinitely, therefore, the wobbling of the head base 4 cannot be removed completely. In particular, extending the space between the holding portions 10 leads to expanding the head base 4 and a response characteristic is also reduced due to an increase in its mass, therefore, extending the space is impractical.

One conventional attempt to control wobble is depicted schematically in FIGS. 6(a), 6(b) and 6(c). A spring 109, typically a bow spring, is inserted between the rack 13 and head base 4 which biasses the rack 13 and head base 4 apart 3. While this reduces wobble somewhat when the driving pinion 111 is located near the center of the longitudinal extent of the rack, (FIG. 6(b)), it does not completely fix the problem, particularly when the driving pinion 111 for the rack is located near the end positions of rack 13 (FIGS. 6(a) and 6(c)). In other words, a moment force is still generated when the pinion 111 is offset from the center position of the rack 13 which has its largest magnitude when the pinion 111 is at either end of rack 13.

SUMMARY OF THE INVENTION

The invention is designed to overcome the foregoing problems in the conventional optical disk unit 1. The invention comprises a rotation driving mechanism for freely rotatably holding an optical disk having a spiral track, a head base supported by a seek shaft passing through it in a radial direction of the optical disk so as to slide freely therealong, an optical head mounted on the head base for optically scanning the track of the optical disk, and a pressing portion arranged in the head base for pressing against the seek shaft. When the optical disk is driven to rotate by the rotation driving mechanism, the optical head moves relatively to the spiral track in a radial direction, but the head base on which the optical head is mounted shifts on the seek shaft, therefore, the optical head follows the track of the optical disk. Although there is naturally a clearance in the structure where the head base holds the seek shaft, the pressing portion set in the head base presses the seek shaft and the head base does not therefore wobble about the seek shaft. Moreover, since the pressing portion moves with the optical head along the seek shaft, wobble is reduced no matter where the drive pinion is in relation to the driven rack.

A pair of spaced holding portions formed on the head base may be used for holding the seek shaft. The pressing portion is then arranged between the pair of the holding portions in a dead space of the head base, but at a position so as to eliminate or significantly reduce directly the wobbling which occurs between the holding portions and the seek shaft.

The pressing portion may also be arranged near one of a pair of the holding portions. Therefore, even if a driving portion of a sledge mechanism is arranged in a position biased to one of a pair of the holding portions, the pressing portion is arranged in a position so as to eliminate or reduce appropriately a moment caused by the driving stress.

The above and other objects, advantages and features of the invention will be more readily understood from the ensuing detailed description of the invention which is provided in connection with the accompanying drawings.

BRIEF DESCRIPTION OF THE DRAWINGS

FIG. 6(a) shows a drive pinion on the left of a rack 13; FIG. 6(b) shows the drive pinion approximately centered along rack 13; and FIG. 6(c) shows the drive pinion on the right of rack 13;

DETAILED DESCRIPTION OF THE INVENTION

Figure 1:
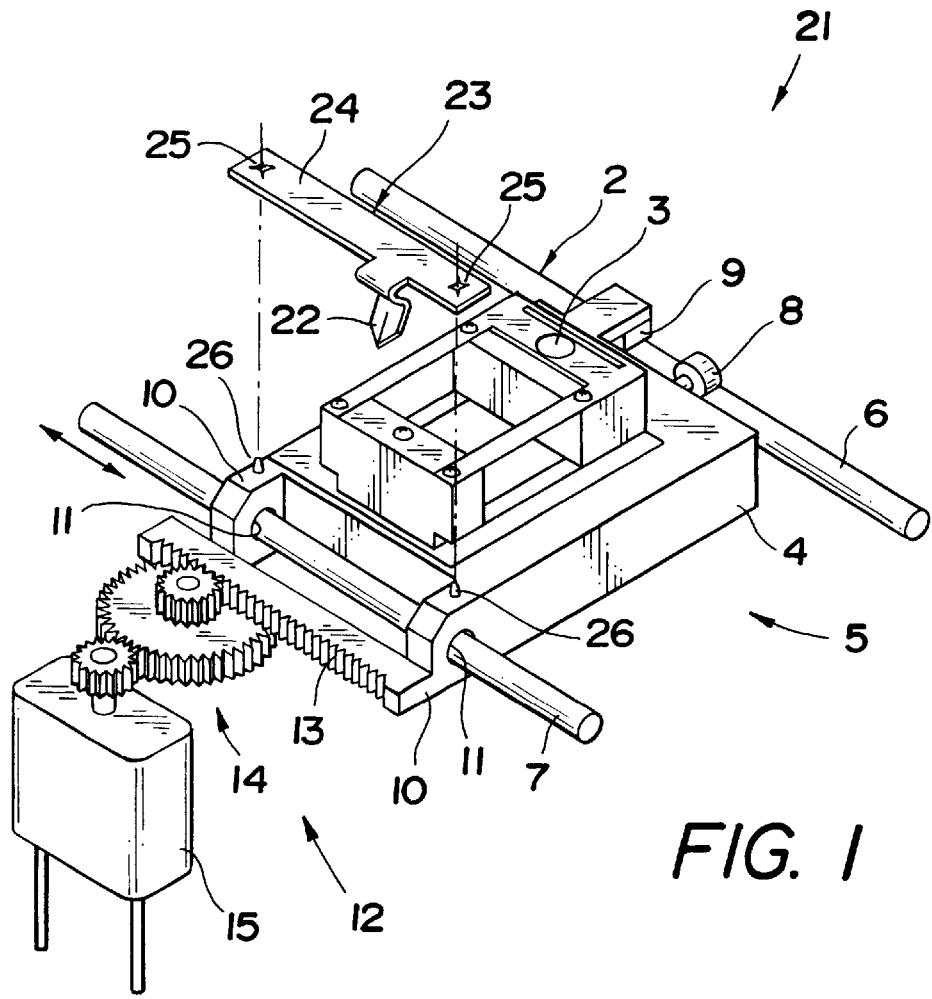
FIG. 1 is a perspective view illustrating an optical disk unit of an embodiment according to the invention.
Figure 2:
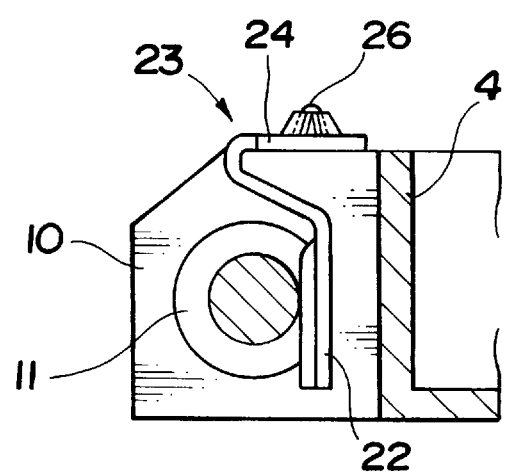
FIG. 2 is a longitudinal sectional side view illustrating a part of a pressing portion.
Figure 3:
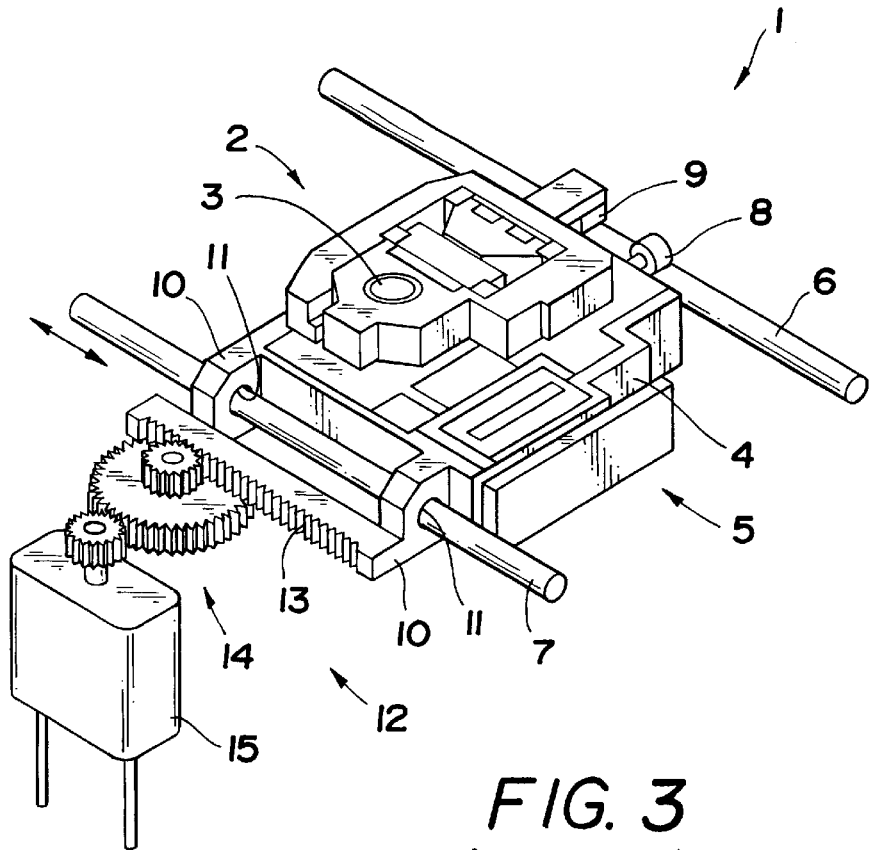
FIG. 3 is a perspective view illustrating a conventional optical disk unit.
Figure 4:
FIG. 4 is a diagram illustrating a relationship between a clearance of a pair of holding portions and a rotation angle of wobbling of a head base.
Figure 5:
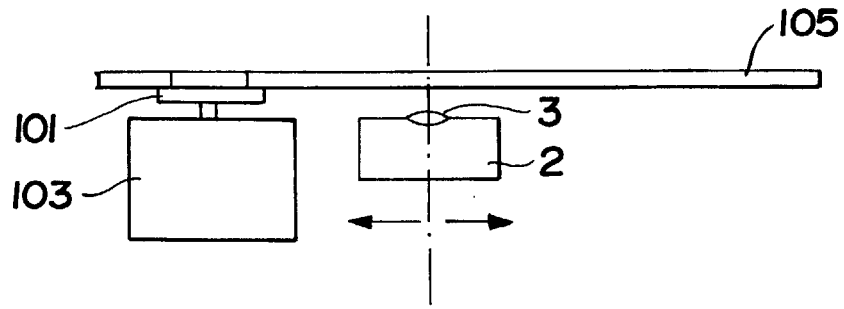
FIG. 5 is a section schematic view of a conventional optical disk unit.

FIGS. 1 and 2 show an embodiment of the invention. A detailed explanation of the construction and operation of disk unit 21 is omitted herein as essentially the same parts are used as in the conventional optical disk unit 1 previously described with respect to FIGS. 3 and 5. Parts in FIG. 1 which are similar to those in FIG. 3 have the same names and reference numbers. In addition, directions such as back and forth or up and down described in this embodiment are used for convenience to simplify the explanation, but they are not limiting with respect to directions for actual installation or uses of the unit 21.

The optical disk unit 21 comprises a rotation driving mechanism including a turntable 101 and motor 103 for holding an optical disk enabling it to rotate freely and a head base 4 on which an optical head 2 is mounted supported by seek shafts 6 and 7 in a radial direction of the optical disk so as to move freely in the radial direction. At the front edge of the head base 4, there are provided a pair of projecting holding portions 10 for holding the seek shaft 7 along which the optical disk unit 21 freely slides. A pressing portion 22 is provided between the holding portions 10 which presses against the seek shaft 7.

The pressing member 23, made of a spring material in this embodiment, has a slender fixed portion 24 from which the pressing portion 22 projects. The pressing portion 22 is bent downward relative to the fixed portion 24 and it can be bent so that it elastically presses against shaft 7. Matched holes 25 are formed at both ends of the fixed portion 24 and the matched holes 25 are matched with pins 26 projecting on a surface of the holding portions 10. Therefore, the head base 4 is equipped with the pressing member 23, so that the pressing portion 22 is pressing the seek shaft 7 at a position between the holding portions 10.

The pressing portion 22 of the pressing member 23 is located near one of a pair of the holding portions 10 on the head base 4. The pressing member 23 is also located on one side of shaft 7, while a driving portion 12 of sledge mechanism 5 is located on an opposite side. In other words, the driving portion 12 of the sledge mechanism 5 is located on the left of the shaft 7 on the head base 4, as viewed in FIGS. 1 and 2, and the pressing portion 22 of the pressing member 23 is located on the right side and between a pair of the holding portions 10 on the head base 4, and is biased to the left side.

In this configuration, the optical disk unit 21 also supports the head base 4 with the seek shafts 6 and 7 so as to slide freely to move the optical head 2 in a radial direction of the optical disk by using the sledge mechanism 5.

Although there is a clearance between the seek shaft 7 and the holding portions 10 on the head base 4 to allow the sliding operation, the head base 4 does not wobble about the seek shaft 7 since the pressing portion 22 fitted to the head base 4 is pressing the seek shaft 7. Therefore, no shock or vibration is applied to the optical head 2 by an operation of the sledge mechanism 5, which prevents vibration of an object lens 3 and an information recording or reproducing error.

Furthermore, since the pressing portion 22 is located between the pair of holding portions 10, wobbling between the holding portions 10 and the seek shaft 7 is directly eliminated or reduced by the pressing portion 22, and the head base 4 need not be enlarged since the pressing portion 22 is located in a dead space.

In addition, the pressing portion 22 is located near one of a pair of the holding portions 10 and it is on the opposite side of the seek shaft 7 relative to the driving portion 12 of the sledge mechanism 5, therefore, the pressing portion 22 can appropriately eliminate or reduce a moment applied from the sledge mechanism 5 to the head base 4.

Figure 7:
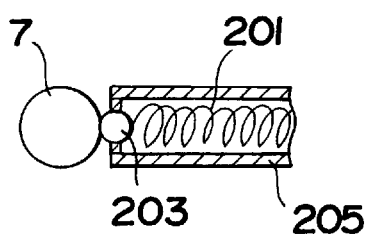
FIG. 7 illustrates in partial sectional view a modified embodiment of the invention.
Figure 8:
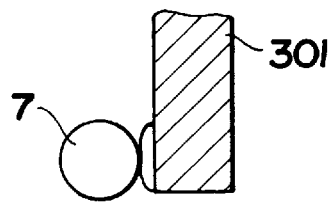
FIG. 8 illustrates in partial sectional view of another modified embodiment of the invention.
Figure 6A:
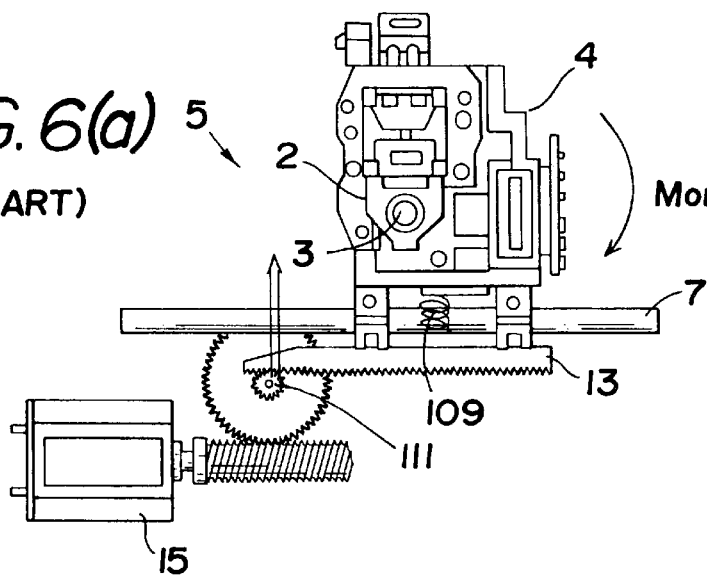
FIGS. 6(a), 6(b) and 6(c) are top views of the conventional optical disk unit, depicting its different operational positions.
Figure 6B:
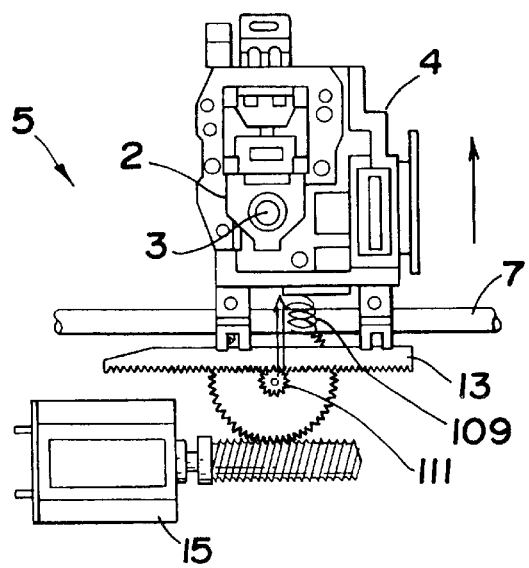
Figure 6C:
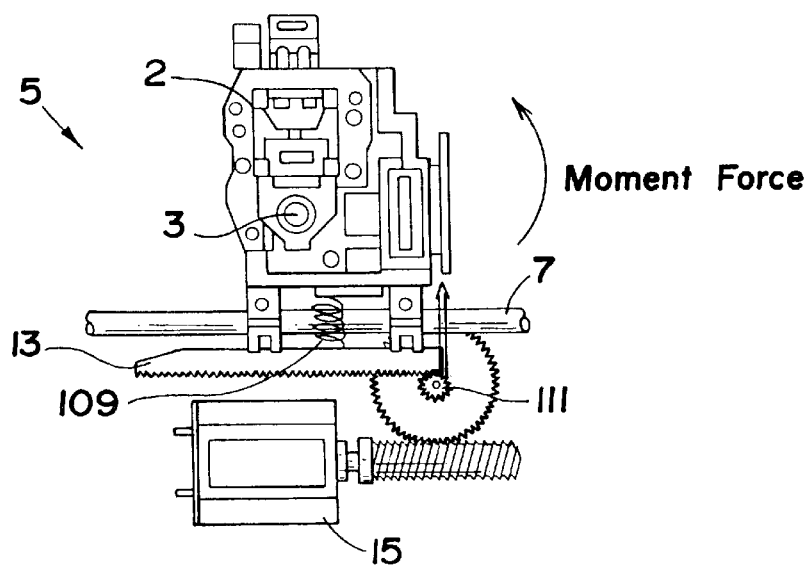

This invention is not limited to the above embodiment, but may be modified in various ways. For example, although the pressing portion 22 is arranged by installing the separate pressing member 23 to the head base 4, a pressing portion can be integrated into a head base. Further, although the pressing portion 22 has a simple structure such as the plate spring, it can, as shown in FIG. 7, be in the form of a coil spring 201 which is located in a guide sleeve 205 of head base 4 and which presses a ball 203 against the shaft 7. In addition, the pressing portion may be in the form of a rubber member 301 mounted on head base 4 and having a metal or other low friction material member 303 for pressing against shaft 7, as shown in FIG. 8.

The invention prevents an information reproducing error and a loss of information to be recorded caused by a shock or vibration applied to the optical head 2 since wobbling of the head base 4 at the seek shaft 7 can be eliminated or significantly reduced through a pressure of the pressing portion.

Moreover, the pressing portion is arranged between the pair of the holding portions 10, so the head base 4 need not be enlarged since the pressing portion 22 is arranged in the dead space of the head base 4.

Moreover, with the pressing portion arranged near one of the pair of the holding portions 10, a moment caused by a stress of the driving portion of the sledge mechanism 5 can be appropriately eliminated by the pressing portion even if the driving portion is located in a position biased toward one of the pair of holding portions.

While preferred embodiments of the invention has been described and illustrated, it should be apparent that many modifications can be made without departing from the spirit and scope of the invention. Accordingly, the invention is not limited by the foregoing description, but is limited only by the scope of the attached claims.

We claim:

1. An optical disk unit for reading from and/or writing to an optical disk comprising:

a rotation driving mechanism for holding an optical disk, a seek shaft;

a head base supported by said seek shaft, said seek shaft being arranged such that said head base slides freely along said seek shaft in a radial direction of said driving mechanism, an optical head mounted on the head base, a pressing portion mounted on and extending from said head base to create a force which presses against said seek shaft to reduce wobble of said head base during movement of said head base along said seek shaft, and wherein said head base includes a pair of holding portions spaced a given distance apart for holding the seek shaft, and wherein the pressing portion is arranged between said pair of holding portions.

2. An optical disk unit as defined in claim 1, wherein the pressing portion is arranged near one of said holding portions.

3. An optical disk unit as in claim 1 wherein said head base cooperates with a driving mechanism which moves said head base along said seek shaft, said drive mechanism being located on one side of said seek shaft, and wherein said pressing portion presses on a side of said seek shaft opposite the side on which said driving mechanism is located.

4. An optical unit as in claim 1 wherein said pressing portion extends from a pressing member which is attached to said head base.

5. An optical unit as in claim 1 wherein said pressing portion is integrated into said head base.

6. An optical unit as in claim 1 wherein said pressing portion is made of a spring material.

7. An optical unit as in claim 1 wherein said pressing portion is a coil spring which presses a contact member against said seek shaft.

8. An optical unit as in claim 1 wherein said pressing portion is formed of rubber and has a contact member which presses against said seek shaft.

* * * * *